(12) United States Patent
Lutz

(10) Patent No.: US 11,656,163 B2
(45) Date of Patent: May 23, 2023

(54) METHOD FOR MEASURING THE VAPOR PRESSURE OF LIQUID AND SOLID SUBSTANCES

(71) Applicant: GRABNER INSTRUMENTS MESSTECHNIK GMBH, Vienna (AT)

(72) Inventor: Josef Lutz, Rohrau (AT)

(73) Assignee: GRABNER INSTRUMENTS MESSTECHNIK GMBH, Vienna (AT)

( * ) Notice: Subject to any disclaimer, the term of this patent is extended or adjusted under 35 U.S.C. 154(b) by 458 days.

(21) Appl. No.: 16/762,687

(22) PCT Filed: Nov. 8, 2018

(86) PCT No.: PCT/AT2018/000090
§ 371 (c)(1),
(2) Date: May 8, 2020

(87) PCT Pub. No.: WO2019/094994
PCT Pub. Date: May 23, 2019

(65) Prior Publication Data
US 2021/0172846 A1 Jun. 10, 2021

(30) Foreign Application Priority Data
Nov. 14, 2017 (AT) .................................. A 446/2017

(51) Int. Cl.
*G01N 7/14* (2006.01)
(52) U.S. Cl.
CPC ...................................... *G01N 7/14* (2013.01)
(58) Field of Classification Search
CPC .................................... G01N 7/14; G01N 7/16
(Continued)

(56) References Cited

U.S. PATENT DOCUMENTS

| 4,783,989 A | * | 11/1988 | Reed | .......................... | G01N 7/14 |
| | | | | | 73/64.45 |
| 4,901,559 A | * | 2/1990 | Grabner | .................... | G01N 7/14 |
| | | | | | 73/64.45 |

(Continued)

FOREIGN PATENT DOCUMENTS

| DE | 69120088 T2 | 10/1996 |
| DE | 10213076 A1 | 9/2002 |

(Continued)

OTHER PUBLICATIONS

International Search Report dated Feb. 13, 2019 issued in corresponding International Application No. PCT/AT2018/000090 with English translation (4 pgs.).

*Primary Examiner* — Marrit Eyassu
(74) *Attorney, Agent, or Firm* — Pillsbury Winthrop Shaw Pittman, LLP

(57) ABSTRACT

In a method for measuring the vapor pressure of liquid and solid substances, in which a sample of the substance is arranged in a variable volume of a measuring cell, the measuring cell is gas-tightly closed. The volume of the measuring cell is increased until reaching a measuring volume, and at least one first value of the gas pressure prevailing after the increase in volume is measured. The volume of the measuring cell is additionally reduced until reaching the measuring volume, and at least one second value of the gas pressure prevailing after the reduction of the volume is measured. The vapor pressure is calculated from the at least one first and at least one second measured values.

12 Claims, 2 Drawing Sheets

(58) Field of Classification Search
USPC .......................................................... 73/64.45
See application file for complete search history.

(56) References Cited

U.S. PATENT DOCUMENTS

| | | | | |
|---|---|---|---|---|
| 5,172,586 | A * | 12/1992 | Reed ....................... | G01N 25/00 |
| | | | | 73/64.45 |
| 2012/0266663 | A1 * | 10/2012 | Benet ....................... | G01N 3/08 |
| | | | | 73/64.45 |

FOREIGN PATENT DOCUMENTS

| | | | |
|---|---|---|---|
| EP | 0689044 | A1 | 12/1995 |
| WO | 2013/033198 | A1 | 3/2013 |

* cited by examiner

METHOD FOR MEASURING THE VAPOR PRESSURE OF LIQUID AND SOLID SUBSTANCES

CROSS-REFERENCE TO RELATED APPLICATIONS

This application is a national stage entry of PCT/AT2018/000090, filed Nov. 8, 2018, which claims priority to Austrian Patent Application No. A 446/2017, filed Nov. 14, 2017, the entire contents of both of which are herein incorporated by reference in their entireties.

BACKGROUND

Field

The invention relates to a method for measuring the vapor pressure of liquid and solid substances, in which a sample of the substance is arranged in a variable volume of a measuring cell, the measuring cell is gas-tightly closed, the volume of the measuring cell is increased until reaching a measuring volume, and at least one first value of the gas pressure prevailing after the increase in volume is measured.

DESCRIPTION OF RELATED ART

The vapor pressure of a substance is substantially determined by its material properties and temperature. An option known from the prior art for measuring the vapor pressure of liquids and solid bodies within a pressure range of a few kPa to very high pressures is the use of a measuring cell comprising a displaceable piston.

The known measuring process comprises the following steps:
a) the measuring cell, at a predetermined position of the piston, is completely filled with the sample material for which the vapor pressure is to be measured;
b) after this, the measuring cell is vacuum-tightly closed;
c) the piston is moved such that the volume increases so as to provide an additional evacuated volume;
d) the filled-in sample releases into the additional volume so many gas portions until a state of equilibrium between the gas phase, on the one hand, and the liquid or solid phase, on the other hand, is reached;
e) the thus resulting pressure in the gas volume corresponds to the vapor pressure of the material.

The measured results for the vapor pressure of the sample can be strongly falsified, if foreign gases are dissolved in the sample (e.g. air in water). The dissolved gases contribute by their partial pressure to the overall pressure in the gas volume so as to pretend a higher vapor pressure.

In order to be able to correctly measure the vapor pressure of a liquid despite dissolved gases, the triple point measuring method was developed (e.g. ASTM D6378, ASTM D6377). It applies under the assumption that the dissolved gases behave like ideal gases. In the triple point measuring method, the above-described measurement of the vapor pressure is repeated with three different volumes of the gas phase, and the three measured values are subjected to an evaluation to the effect that the partial pressure portion of the ideal gases respectively contained therein is each determined and subtracted out.

For correct results, it is, furthermore, essential for the sample and gas phases to be in equilibrium when determining the overall pressure. This may, however, take some time. During the measuring process, the following pressure curve is to be observed. By the movement of the piston and the thus caused volume increase, the pressure drops until the piston end position is reached. After this, the pressure increases again because of the gas escaping from the sample into the additional volume, until a state of equilibrium is reached. In the starting phase, this usually occurs as an exponential pressure increase. With very slowly outgassing samples, this is followed by a very long period of an almost linear pressure increase with a small and very slowly decreasing gradient. The theoretical state of equilibrium will not be reached before the pressure is constant. The automatic recognition of a constant pressure is attempted by recording the pressure curve; this is, however, extremely difficult, because the pressure change rates over a range of several minutes frequently lie below the noise in the pressure signal.

It is only when a constant pressure is attained that one can be sure that a) the entire sample volume has the same temperature, and b) the gas portions in the gas volume are in equilibrium with the gases dissolved in the liquid. In order to ensure this, it is possible to either specify a fixed waiting time (time of equalization) or, with unknown samples, specify a maximum increase of the pressure.

The substantial disadvantage of previous measuring methods for samples outgassing very slowly is demonstrated by the following examples:
a) When determining the vapor pressure of slowly outgassing samples, such as in water (the time of equalization may be more than one hour), not only very long measuring times will be caused, but, due to the finite tightness of the measuring cell, also falsifications of the obtained measurements will occur.
b) When determining the overall pressure for small gas volumes above a liquid, the maximum pressure may be massively underestimated due to equalization times that are too short. This constitutes a great risk, in particular with petrochemical products, since the overall pressure to be expected constitutes an important parameter for the safety in the transport of such products.

SUMMARY

It is, therefore, an object of the invention to provide a method for measuring the vapor pressure of liquid and solid substances, by which the above-described drawbacks can be overcome or reduced. In particular, a method that allows for a rapid and reliable measurement of the vapor pressure even of very slowly outgassing samples is to be provided.

To solve this object, the invention in a method of the initially defined kind provides that the volume of the measuring cell is additionally reduced until reaching the measuring volume, and at least one second value of the gas pressure prevailing after the reduction of the volume is measured, and the vapor pressure is calculated from the at least one first and at least one second measured values. This method, thus, in addition to measuring at least one first measured value of the pressure during outgassing after a decompression also provides measuring at least one second measured value of the pressure after a compression of the gas. If, as is preferably provided, measuring of the first pressure value and measuring of the second pressure value are performed at the same temperature, and the decompression and the compression are performed to the same volume, i.e. the pregiven measuring volume, the same pressure will have to adjust in both processes, i.e. decompression and compression, when a state of equilibrium is reached. Since the adsorption and the desorption of the gaseous substance in a first approximation are identical physical processes and therefore symmetrical, the time constant for both processes (including the temperature equalization) will be identical for practical considerations.

It is thereby possible, by utilizing the same time constants, to considerably shorten the measuring process, since the two determined values help calculate the vapor pressure in a simple manner. It is not required to wait until reaching complete pressure equalization in the volume of the measuring cell, which results in an important time saving.

The determination of the at least one first measured value and the at least one second measured value thus preferably takes place prior to reaching a state of equilibrium between the gas phase and the liquid or solid phase. The determination of the at least one first measured value and the at least one second measured value in a particularly preferred manner takes place prior to the expiration of half of the time required for reaching the state of equilibrium.

The determination of just a single first measured value and a single second measured value will, for instance, do if the respective measured value is determined upon expiration of a predefined time after reaching the measured value. Assuming that the adsorption and the desorption of the gaseous substance in a first approximation are identical physical processes and hence symmetrical, the sought vapor pressure can be calculated as the mean value of the first and second measurements.

According to an alternative, preferred mode of operation, it is, however, provided that at least two first measured values and at least two second measured values are measured, that a quantity characterizing the decreasing and the increasing pressure curve, respectively, is each determined from the at least two measured values, and that the vapor pressure is calculated from the characterizing quantities. The time interval between the determination of the respective at least two measured values in this case is preferably chosen to be equal in the adsorption and in the desorption phases in order to obtain mutually comparable values in both processes. Furthermore, the time interval between reaching the measuring volume and determining the at least two measured values is preferably chosen to be identical in the adsorption and in the desorption phases.

In respect to the calculation of the vapor pressure, it may preferably be proceeded such that the quantity characterizing the decreasing and the increasing pressure curves, respectively, is each a straight line representing the local slope of the respective pressure curve in a time/pressure coordinate system, and the vapor pressure is calculated as the point of intersection of the straight lines.

In the context of the method according to the invention, the order of the determination of the at least one first measured value and the at least one second measured value is irrelevant. The invention, therefore, comprises both configurations in which at first, after decompression, at least a first measured value and subsequently, after compression, at least one second measured value are determined, and configurations in which at first, after compression, at least one second measured value and subsequently, after decompression, at least one first measured value are determined.

In order to be able to perform a compression followed by a decompression to the same measuring volume, or perform a decompression followed by a compression to the same measuring volume, an intermediate step has to be provided between the two steps, said intermediate step comprising an increase of the volume beyond, or decrease of the volume below, the measuring volume.

A possible embodiment of the method, for instance, provides that the volume of the measuring cell is further increased to a transition volume after the determination of the first measured value and prior to the determination of the second measured value. In this respect, the method provides that in a first step the volume of the measuring cell is increased to the measuring volume and subsequently the at least one first value of the gas pressure prevailing after the increase in volume is measured, that in a second step the volume is further increased to a transition volume, that in a third step the volume of the measuring cell is reduced to the measuring volume and subsequently the at least one second value of the gas pressure prevailing after the reduction of the volume is measured, and that in a fourth step the vapor pressure is calculated from the at least one first and the at least one second measured values. In the second step, the volume is preferably maintained over a period of time that is not significantly smaller than the equalization times for steps one and three. It should preferably be equal or substantially larger.

Alternatively, it may be provided that the volume of the measuring cell, starting from a level above the measuring volume, in a first step is reduced to the measuring volume and subsequently the at least one second value of the gas pressure prevailing after the reduction of the volume is measured, that in a second step the volume is further reduced to a transition volume, that in a third step the volume of the measuring cell is increased to the measuring volume and subsequently the at least one first value of the gas pressure prevailing after the increase in volume is measured, and that in a fourth step the vapor pressure is calculated from the at least one first and the at least one second measured values. In the second step, the volume is preferably maintained over a period of time that is not significantly smaller than the equalization times for steps one and three. It should preferably be equal or substantially larger.

The volume of the measuring cell is preferably designed to be variable in that the volume is limited by a movable piston. A preferred configuration in this respect provides that the volume of the measuring cell is varied with the aid of a piston. This constitutes a simple, rapid and precise option of changing the volume of the measuring cell.

Furthermore, it is preferably provided that the at least one first value and the at least one second value are each determined after an identical period of time following the completion of the volume change.

The provision of a time interval between the completion of the volume change and the measuring of the values offers the advantage that the influence of equalizing processes, in particular temperature equalizing processes, can be reduced or eliminated.

It is preferably provided that the sample in the measuring cell is changed in temperature, in particular heated. This is of particular relevance where the vapor pressure of a sample depends strongly on the temperature or where the vapor pressure is to be determined as a function of the temperature.

If a movable piston is provided, which is designed to change the volume of the measuring cell, the method can preferably be performed such that the sample is sucked into the measuring cell with the aid of the piston and the sample, upon completion of the measurement, is pressed out of the measuring cell, preferably with the aid of the piston. While filling the measuring cell with the sample, the piston increases the volume of the measuring cell such that a negative pressure is caused and the respective fluid is conducted from an inlet pipe into the measuring cell. When the determination of the vapor pressure is completed, the piston is guided into the other direction, decreases the volume of the measuring cell and thereby presses the fluid out of the measuring cell.

Furthermore, it is preferably provided that the at least one first measured value and the at least one second measured value are measured in the measuring cell with the aid of a pressure sensor integrated in the piston.

In a preferred configuration, it is provided that a measuring cycle comprising the determination of the at least one first measured value and the at least one second measured value is repeated at least once, preferably twice, wherein the measuring volume is each chosen to be different. A two-time repetition—three measuring cycles are thus performed—is termed a triple point measuring method. This approach allows for the determination of the portion of the ideal gases in relation to the overall pressure. The difference between the overall pressure and the partial pressure of the ideal gases yields the vapor pressure of the sample. The method thus avoids a falsification of the determination of the vapor pressure by gases dissolved in the sample, such as air in water.

The biggest advantage of this method is obtained in the determination of the theoretical vapor pressure for a gas volume of 0 (TVP—true vapor pressure). On an international scale, this value is used as a critical value for safety matters in transportation etc. and can only be theoretically determined by extrapolation due to the temperature-dependent expansion of the fluid. For an exact determination, a) more than two points and b) gas volumes as small as possible are of advantage. In addition, such samples (petroleum etc.) in many cases have very long time constants for outgassing.

BRIEF DESCRIPTION OF THE DRAWINGS

In the following, the invention will be explained in more detail by way of an exemplary embodiment schematically illustrated in the drawing.

Therein.

DETAILED DESCRIPTION

Figure 1:
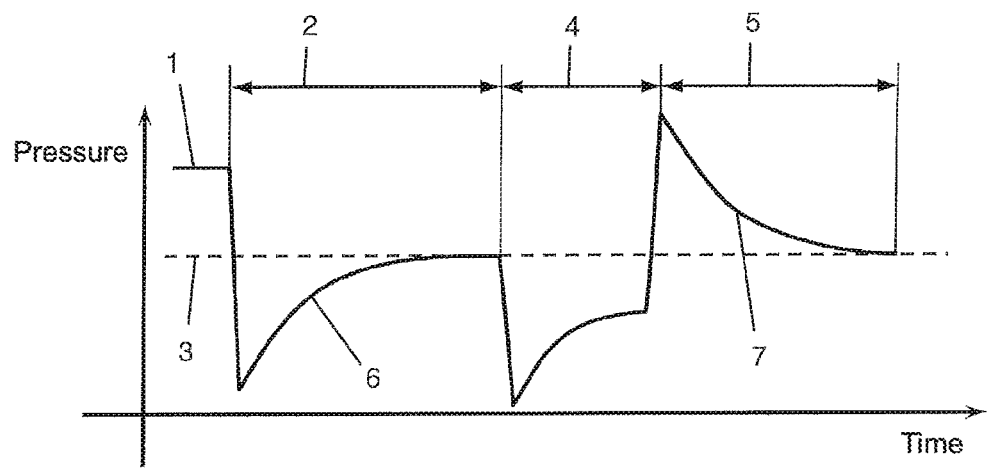
FIG. 1 is a schematic illustration of a pressure/time diagram when carrying out the method according to the invention.

FIG. 1 depicts the pressure curve during a method according to the invention in a measuring cell. After having arranged the sample in the measuring cell, an initial pressure 1 exists in the volume of the measuring cell. In the first step 2, the volume of the measuring cell is increased to a measuring volume. The pressure in the measuring cell initially drops and, due to the gases escaping from the sample, subsequently rises again until the pressure in the volume of the measuring cell reaches the equilibrium pressure, which corresponds to the vapor pressure 3. The pressure curve follows curve 6.

During this pressure increase, at least a first value of the gas pressure is measured. As soon as the at least one first value has been measured, the volume of the measuring cell can be further increased to a transition volume in the second step 4. In doing so, the pressure again initially drops and subsequently rises again, yet can never rise beyond the vapor pressure 3. After this, the volume in the measuring cell is reduced to the measuring volume in a third step 5. In doing so, the pressure initially increases and, due to a partial absorption of the gas in the sample, subsequently drops again until the vapor pressure 3 is reached. The pressure curve follows curve 7. During the pressure drop, at least a second value of the gas pressure is measured. As soon as the at least one second value has been measured, the method can be terminated. It is thus not necessary to wait for the respectively complete pressure equalization illustrated in FIG. 1, i.e. until the vapor pressure is reached, prior to beginning with the next step, or terminating the process. After having measured at least one first and at least one second value, these values can be used to calculate the vapor pressure as illustrated in FIG. 2.

Figure 2:
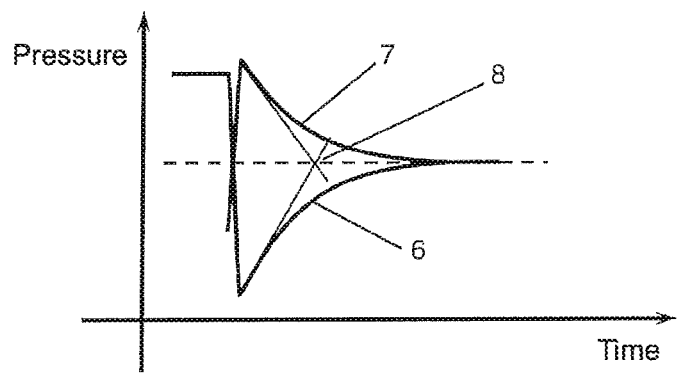
FIG. 2 is a schematic illustration of a first mode of calculation of the vapor pressure using the method according to the invention in a pressure/time diagram.

FIG. 2 illustrates a first way of calculation of the vapor pressure according to the invention. To this end, the pressure curves after the increase of the volume to the measuring volume (curve 6, first step 2) and after the reduction of the volume to the measuring volume (curve 7, third step 5) are laid one above the other in a time/pressure diagram. It is apparent that the curves 6, 7 are substantially symmetrical, i.e. that the vapor pressure is reached after the same period of time following the same pressure curve mirrored by the vapor pressure. In the case of the calculation illustrated in FIG. 2, the slope of the pressure curve is each determined, and the point of intersection 8 of the straight lines corresponding to the respective local pressure gradients is calculated, at the same point of time after reaching the measuring volume.

Figure 3:
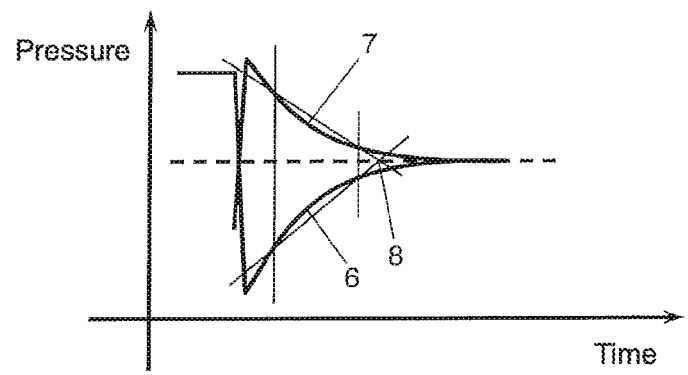
FIG. 3 is a schematic illustration of a second mode of calculation of the vapor pressure using the method according to the invention in a pressure/time diagram.

In an alternative mode of operation according to FIG. 3, two first pressure values and two second pressure values are each measured after identical time intervals so as to determine a slope in the form of a straight line each from the pressure difference determined in a defined time interval. After this, the point of intersection 8 of the two slopes is calculated. The vapor pressure is located in the point of intersection 8. Alternatively, it is also possible to each determine, at the same time interval, only a first and a second value of curves 6, 7 of the maximum and minimum pressures, respectively, whereupon the mean value of these measured points is calculated, which constitutes the vapor pressure.

Figure 4:
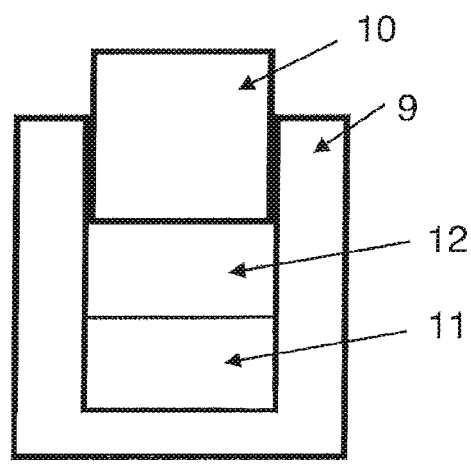
FIG. 4 schematically depicts a measuring cell for carrying out the method according to the invention.

FIG. 4 depicts a measuring cell 9 comprising a piston 10, which defines a volume together with the measuring cell 9. The sample is arranged in the lower region 11 of the volume of the measuring cell, and a gas phase of the sample is formed in the upper region 12. By varying the position of the piston 10, the volume can be increased or reduced so that the method according to the invention can be performed.

The invention claimed is:

1. A method for measuring a vapor pressure of liquid and solid substances, comprising:
   arranging a sample of the substance in a variable volume of a measuring cell,
   closing the measuring cell in a gas-tight manner,
   increasing the variable volume of the measuring cell until reaching a measuring volume,
   measuring at least one first measured value of a gas pressure prevailing after the increase in volume,
   reducing a transition volume of the measuring cell until reaching the measuring volume,
   measuring at least one second measured value of a gas pressure prevailing after the reduction of the volume, and calculating the vapor pressure from the at least one first measured value and the at least one second measured value.

2. The method according to claim 1, further comprising:
measuring at least two first measured values and at least two second measured values, the at least two first measured values representing a decreasing pressure curve and the at least two second measured values representing an increasing pressure curve,
determining a first characterizing quantity from the at least two first measured values that characterizes the decreasing pressure curve and determining a second characterizing quantity from the at least two second measured values that characterizes the increasing pressure curve, and
calculating the vapor pressure from the first characterizing quantity and the second characterizing quantity.

3. The method according to claim 2, further comprising determining the first characterizing quantity as a first straight line representing a local slope of the decreasing pressure curve in a time/pressure coordinate system, determining the second characterizing quantity as a second straight line representing a local slope of the increasing pressure curve in a time/pressure coordinate system and calculating the vapor pressure as a point of intersection of the first straight line and the second straight line.

4. The method according to claim 1, further comprising further increasing the volume of the measuring cell to the transition volume after said measuring of the at least one first measured value and prior to said measuring of the at least one second measured value.

5. The method according to claim 1, further comprising reducing the volume of the measuring cell to a transition volume after said measuring of the at least one first measured value and prior to said measuring of the at least one second measured value.

6. The method according to claim 1, further comprising varying the volume of the measuring cell with the aid of a piston.

7. The method according to claim 1, further comprising determining the at least one first measured value and the at least one second measured value after an identical period of time following completion of said increasing the volume of the measuring cell and said reducing the transition volume of the measuring cell, respectively.

8. The method according to claim 1, further comprising changing a temperature of the sample in the measuring cell.

9. The method according to claim 6, further comprising sucking the sample into the measuring cell with the aid of the piston and pressing the sample, upon completion of the measurement, out of the measuring cell.

10. The method according to claim 6, further comprising measuring the at least one first measured value and the at least one second measured value in the measuring cell with the aid of a pressure sensor integrated in the piston.

11. The method according to claim 1, further comprising repeating a measuring cycle comprising said measuring of the at least one first measured value and said measuring of the at least one second measured value at least twice, wherein the measuring volume is each chosen to be different.

12. The method according to claim 1, further comprising repeating a measuring cycle comprising said measuring of the at least one first measured value and said measuring of the at least one second measured value three times, wherein the measuring volume is each chosen to be different.

* * * * *